US010921950B1

(12) United States Patent
Chueh et al.

(10) Patent No.: US 10,921,950 B1
(45) Date of Patent: Feb. 16, 2021

(54) POINTING AND INTERACTION CONTROL DEVICES FOR LARGE SCALE TABLETOP MODELS

(71) Applicant: Ford Global Technologies, LLC, Dearborn, MI (US)

(72) Inventors: Shan Chy Chueh, Ypsilanti, MI (US); Yifan Chen, Ann Arbor, MI (US); Prashant Rao, Ypsilanti, MI (US); John Vincent, Livonia, MI (US); Abhishek Sharma, Ann Arbor, MI (US); James McBride, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/534,969

(22) Filed: Aug. 7, 2019

(51) Int. Cl.
*G06F 3/0481* (2013.01)
*G06F 3/033* (2013.01)
*G06F 3/0484* (2013.01)

(52) U.S. Cl.
CPC .......... *G06F 3/04812* (2013.01); *G06F 3/033* (2013.01); *G06F 3/04815* (2013.01); *G06F 3/04842* (2013.01)

(58) Field of Classification Search
CPC .. G06F 3/04812; G06F 3/033; G06F 3/04815; G06F 3/04842; G06F 3/0346
See application file for complete search history.

(56) References Cited

U.S. PATENT DOCUMENTS

| 10,019,849 | B2 | 7/2018 | Berman et al. | |
| 10,192,335 | B1* | 1/2019 | Wellen | H04N 5/23229 |
| 2009/0237763 | A1 | 9/2009 | Kramer et al. | |
| 2015/0331576 | A1 | 11/2015 | Piya et al. | |
| 2016/0041748 | A1* | 2/2016 | Ball | G06F 16/58 |
| | | | | 715/771 |
| 2016/0196692 | A1* | 7/2016 | Kjallstrom | G06F 3/04815 |
| | | | | 345/633 |

(Continued)

OTHER PUBLICATIONS

Dalsgaard, at al. (2012). Tangible 3D Tabletops: Combining Tangible Tabletop Interaction and 3D Projection. pp. 109-118. doi: 10.1145/2399016.2399033.

(Continued)

*Primary Examiner* — Andrew T Chiusano
(74) *Attorney, Agent, or Firm* — Brandon Hicks; Eversheds Sutherland (US) LLP

(57) ABSTRACT

Pointing and interaction control devices for large scale tabletop models are provided herein. An example method includes determining a frame of reference for a first display, where the first display provides a multi-dimensional representation. The method includes determining a location and a direction of a laser beam emitted by a mobile device having a laser pointing apparatus using motion signals obtained from the mobile device, and the frame of reference. The first display can include a two-dimensional display surface and a physical three-dimensional representation placed onto the two-dimensional display surface. The method can include determining an intersection of a laser beam of the laser pointing apparatus with either the physical three-dimensional representation or the two-dimensional display surface based on the location and the direction of the mobile device relative to the frame of reference.

16 Claims, 6 Drawing Sheets

(56) References Cited

U.S. PATENT DOCUMENTS

2016/0291768 A1* 10/2016 Cho ................... G06F 3/0488
2017/0315629 A1* 11/2017 Hook .................. G06F 3/0346
2019/0034076 A1    1/2019 Vinayak et al.
2019/0102135 A1*  4/2019 Lai ..................... G06K 7/1413

OTHER PUBLICATIONS

Hilliges, O. et al. (2009). Interaction on the Tabletop: Bringing the Physical to the Digital (Dissertation, Ludwig Maximilian University of Munich, Munich, Germany) (203 pages).

* cited by examiner

POINTING AND INTERACTION CONTROL DEVICES FOR LARGE SCALE TABLETOP MODELS

TECHNICAL FIELD

The present disclosure relates to systems and methods for interacting with a display system that includes digital two-dimensional and/or physical three-dimensional large-scale tabletop representations or models. In addition, the systems and methods herein can utilize a laser pointing apparatus that can be integrated into a smartphone, in one embodiment.

BACKGROUND

Large-scale digital modeling, such as a transportation operating system (TOS) allows users to explore TOS concepts and prototyping solutions. Users of these TOS systems are not able to directly control (such as browsing, picking, and manipulate) objects (physical and digital) displayed on a table top model. In sum, these table top models are purely passive in nature.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
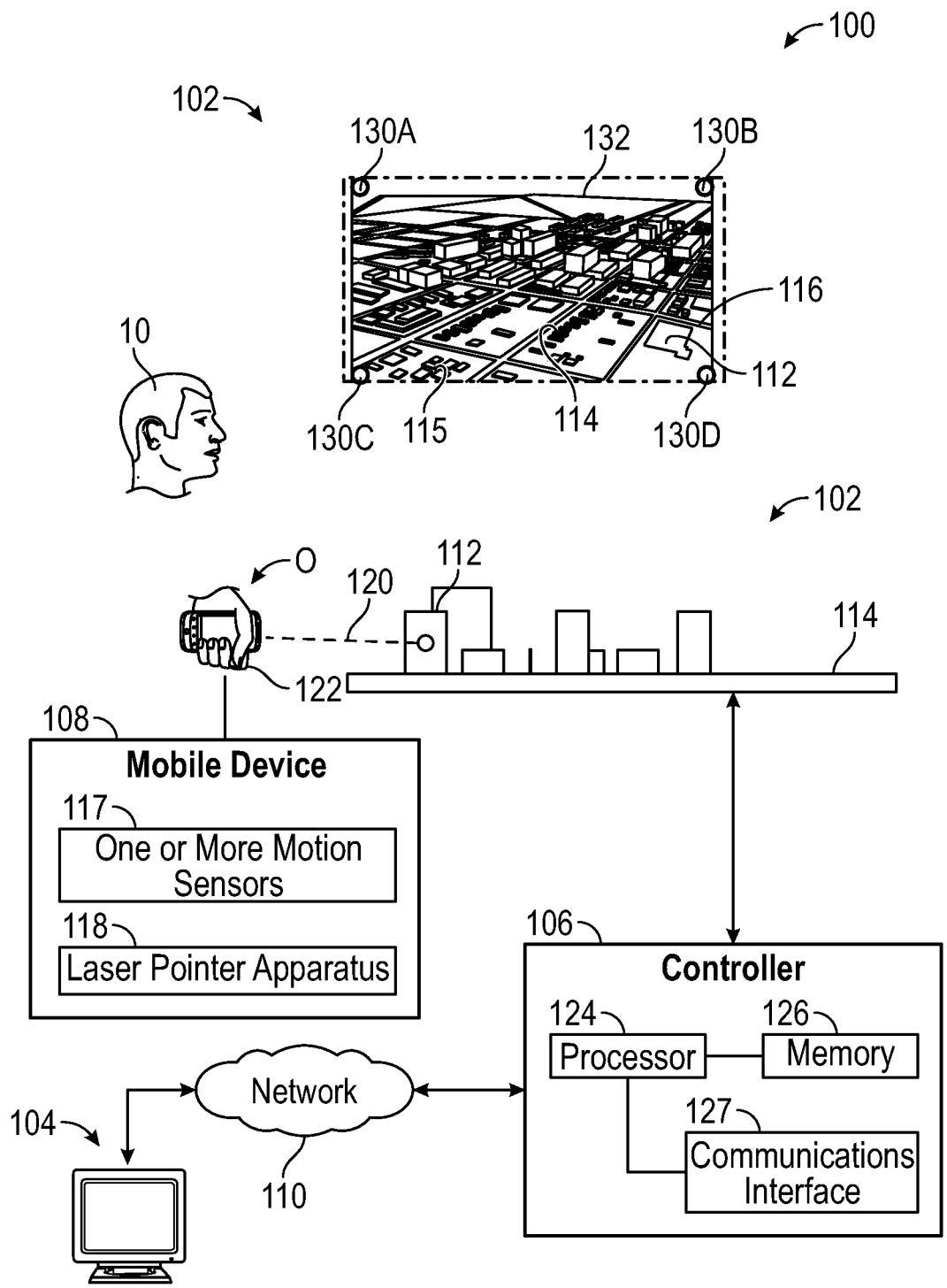
FIG. 1 depicts an illustrative architecture in which techniques and structures for providing the systems and methods disclosed herein may be implemented.

The systems and methods disclosed herein are configured to allow for user interactions within physical and/or digital modeling systems, such as TOS systems. In general, a TOS system is a science-based platform used to model mobility challenges and performance. The TOS system can provide key insights related to how new mobility solutions may impact a location in a holistic way. For effective collaboration and effective presentation of information the TOS system can help foster better policy formation and greater consensus building. Some TOS systems are composed of horizontal screens (such as Light Emitting Diode "LED" screen) as base platform and overlaid on top with a three-dimensional physical model (made by three-dimensional printing using a translucent material). The horizontal screen can dynamically display various layers of city map underneath the three-dimensional physical model. These layers represent characteristics and performance of transportation system, infrastructure and land use—just as an example. In one embodiment, the horizontal screen can also control color shades or illuminance of objects in the three-dimensional model.

Advantageously, the systems and methods disclosed herein allow a user to interact with both static three-dimensional physical objects and a dynamic computer screen output to provide a richer, synchronized multi-display experience for maximum human-data interaction. Some embodiments include a smart device with integrated laser pointing apparatus that can be used as a controller to interact with physical and/or digital multi-dimensional representations of objects. A digital model of a physical three-dimensional representation can be generated, along with a two-dimensional representation, in some embodiments. When the user points at a physical model, a determination can be made as to what physical three-dimensional representation is being pointed at based on an intersection between the digital model of the physical three-dimensional representation and a ray calculated for a laser beam emitted from the smart device.

In one or more embodiments, three-dimensional physical model/representations can be placed on a tabletop display that provides a two-dimensional representation as well. For example, physical models of buildings can be placed in their respective locations on a two-dimensional digital street map. The user can interact with the three-dimensional physical model/representations and/or the two-dimensional digital street map.

In one embodiment, by pointing to the three-dimensional physical model with a laser beam, a display of object specific infographics can be provided in a second display. For example, the systems and methods can determine a location where the laser pointing apparatus is being pointed relative to the digital model using motion signals received from the mobile device. Using one or more actions with the laser pointing apparatus, a user can manipulate or highlight the three-dimensional physical model/representation.

In another example, by pointing to a two-dimensional representation, such as a street map displayed on a table top screen, the smartphone with integrated laser pointing apparatus can be used to activate a computer screen cursor and operate basic mouse control functions to control interactions with the street map. While the present disclosure is not limited to city planning, the descriptions will reference these aspects to provide context for embodiments of the present disclosure. These and other advantages of the present disclosure are provided in greater detail herein.

Illustrative Embodiments

Turning now to the drawings, FIG. 1 depicts an illustrative architecture 100 in which techniques and structures of the present disclosure may be implemented. The illustrative architecture 100 may include a first display 102, a second display 104, a controller 106, and a mobile device 108. These components may communicate with one another over a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct. In some embodiments, some functions disclosed herein can be executed entirely at the controller level. The controller 106 can be a standalone device or could be integrated into the first display 102 or the mobile device 108. FIG. 1 includes a perspective view of the first display 102 is provided along with a side elevation view of the first display 102.

According to some embodiments, the first display 102 is a LED tabletop display for use in TOS systems. The first display 102 provides multi-dimensional representations such as two dimensional representations that are displayed as output on a screen, three-dimensional physical representations, or combinations thereof as will be discussed herein. For example, the first display 102 may provide a two-dimensional digital representation 114 such as a map of city streets or another two-dimensional representation of features of a geographical area.

In some embodiments, the two-dimensional digital representation 114 could include polygons, such as polygon 116. In various embodiments, the first display 102 can be controlled to alter any of a hue, intensity, or other similar attribute of the two-dimensional digital representation 114. For example, after selection of the polygon 116 a user can select to change a color or intensity of light of the polygon 116 to highlight the polygon 116. The polygon 116 could define an area of connected streets, for example. In another example, the polygon 116 could define the footprint of a physical three-dimensional object such as a building.

Additionally, the first display 102 may also comprise one or more three-dimensional representations or models. For example, a three-dimensional representation (e.g. model) 112 can be placed on an upper surface of a screen 115 of the first display 102. In some embodiments, the first display 102 is oriented horizontally relative to a user 10 of the mobile device 108. The three-dimensional representation 112 can be manufactured from an at least partially translucent material such as a polymer or glass. The three-dimensional representation 112 can be a representation of a single object in some embodiments, or a representation of a plurality of objects. For example, the three-dimensional representation 112 could be a representation of a building. In another example, the three-dimensional representation 112 could be a plurality of buildings or other similar structures. In one example, a complete city three-dimensional digital model can be used to generate a physical model using three-dimensional printing. The three-dimensional digital model can also be used to create a digital (Computer Automated Drawing) of the complete city or even a portion thereof.

In one example embodiment, the three-dimensional representation 112 is placed on top of the polygon 116. The polygon 116 is a two-dimensional digital representation that is displayed on the first display 102. In some embodiments, the polygon 116 has a location on the first display 102 that corresponds to a location of the three-dimensional representation 112. Using the example provided above, when the polygon 116 is associated with a translucent three-dimensional model 112, illumination of the polygon 116 by the controller 106 in turn illuminates the translucent three-dimensional model 112, as an example.

Broadly, the mobile device 108 is configured to interact with any of the two-dimensional digital representation 114 and/or the three-dimensional representation 112. For example, the mobile device 108 could be used to select the three-dimensional representation 112 and then interact with the three-dimensional representation 112 using a three-dimensional functional mode. The user 10 could also interact directly with the two-dimensional digital representation 114 using a two-dimensional cursor or pointer functional mode.

In general, the mobile device 108 comprises one or more motion sensors 117 and a laser pointing apparatus 118. The one or more sensors 117 could include, for example, an accelerometer and a gyroscope. Collectively and individually, the one or more motion sensors 117 generate motion signals that are indicative of a position, a location, and/or an orientation of the mobile device 108. The laser pointing apparatus 118 comprises any suitable device that is configured to emit a laser beam 120 that can be directed at the first display 102 to select and or manipulate representations of objects provided thereon. In general, the laser beam 120 is represented mathematically as a ray with an initial point O that is coextensive with the location of the mobile device 108. The direction of the ray of the laser beam 120 correlates to the orientation of the mobile device 108. For example, if the laser pointing apparatus 118 is positioned on the mobile device 108 such that the laser beam 120 is emitted from a top surface 122 of the mobile device 108, the orientation of the top surface 122 of the mobile device 108 defines the direction of the ray of the laser beam 120. In some embodiments, the direction of the ray of the laser beam 120 is determined by the controller 106 from the motion signals received from the mobile device 108 over the network 110.

In some embodiments, the controller 106 comprises a processor 124 and memory 126. The memory 126 stores instructions that are executed by the processor 124 to perform aspects of display control and interaction disclosed herein. When referring to operations executed by the controller 106 it will be understood that this includes the execution of instructions by the processor 124. The controller 106 may be integrated into the first display 102, the mobile device 108, or as a standalone device or service in a server or cloud. In various embodiments, the controller 106 could include a native controller of the first display 102 or the mobile device 108. In these instances, logic used to process motion signals and cause corresponding actions on the first display 102 or the second display 104 can be executed by the native controller. Providing these features in a standalone device allows for decentralization and processing away from the first display 102. The controller 106 can access the network 110 using a communications interface 127.

Figure 2:
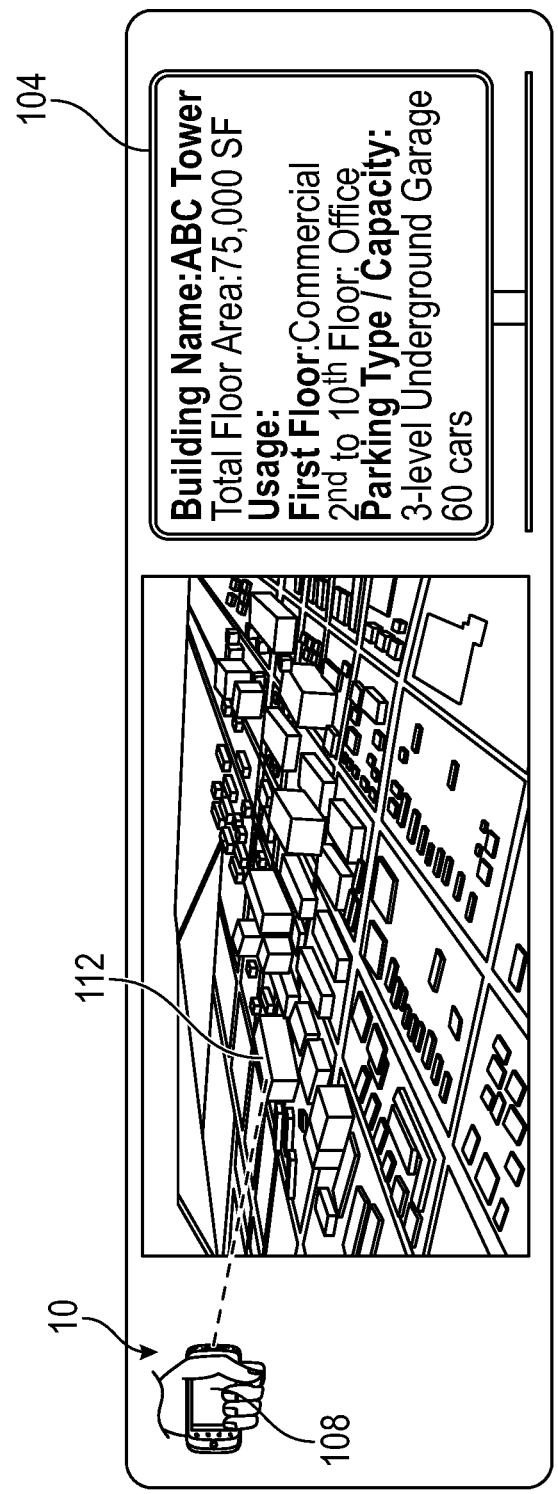
FIG. 2 illustrates an example use case where a physical three-dimensional representation is selected using a laser pointing device of the present disclosure.
Figure 3:
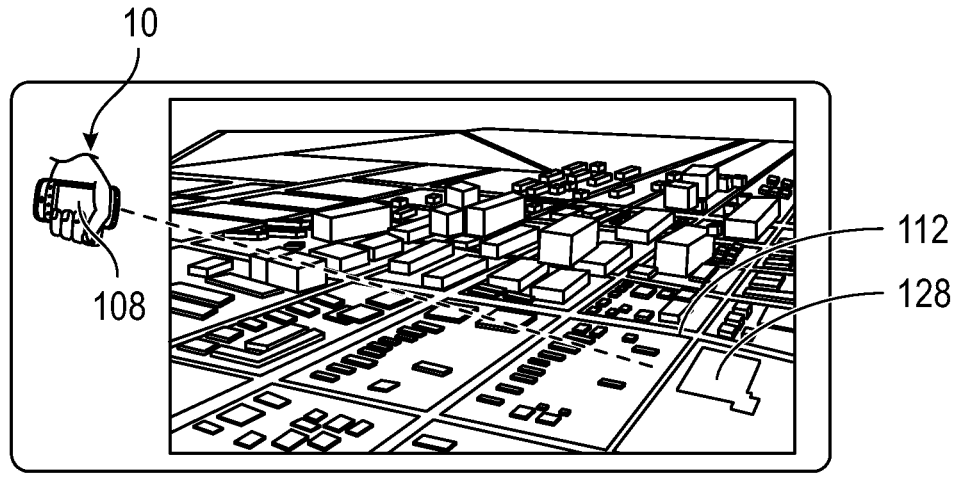
FIG. 3 illustrates an example use case where a digital two-dimensional representation is selected using a laser pointing device of the present disclosure.

As illustrated in FIG. 2, in one embodiment, the user 10 can utilize the mobile device 108 to point to an object such as the three-dimensional representation 112. Upon selection or pointing, object specific infographics can be displayed a remote display, such as the second display 104. In another example, the user 10 can utilize the mobile device 108 to point to an object such as the two-dimensional digital representation 114. As depicted in FIG. 3, the mobile device 108 can be used activate a computer screen cursor 128 and operate basic mouse control to interact with the two-dimensional representations on the first display 102.

The controller 106 can be configured to allow the user 10 to interact with the two-dimensional digital representation 114 on the first display 102. Again, the two-dimensional digital representation 114 comprises various two-dimensional objects which are defined by their locations and attributes. For example, the location and placement of city streets or the footprint of buildings can be represented as two-dimensional representations.

Similarly, the three-dimensional representation 112 is defined by a three-dimensional model. In some embodiments, the three-dimensional model comprises geospatial dimensions for the underlying physical object. For example, if the three-dimensional representation 112 is a building, the three-dimensional model could comprise at least the dimensions of a rectangular prism, but more complicated three-dimensional models can also be used. As noted above, the controller 106 correlates a position of the three-dimensional representation 112 with the two-dimensional representation 114 that associates a location of the two-dimensional representation 114 on the first display 102 with a location of the three-dimensional representation 112. For example, a location of the three-dimensional representation 112 in relation to the first display 102 could be determined as Cartesian X and Y coordinates. Thus, each pixel or group of pixels of the first display 102 can be located using Cartesian X and Y coordinates. In some embodiments, the locations of these objects are determined relative to frame of reference established for the first display 102, which is described in greater detail infra.

Referring now to FIGS. 1 and 3 collectively, the controller 106 can be configured to calibrate the mobile device 108 in relation to the first display 102. This process includes collaborative action and communication between the mobile device 108 and the controller 106. In one or more embodiments, the user can utilize the mobile device 108 to direct the laser beam 120 at one or more reference points on the first display 102. One embodiment includes the use of four reference points 130A, 130B, 130C, and 130D, each being disposed in a corner of the first display 102. These can include illuminated objects placed into the corners of the first display 102.

When the laser beam 120 is directed one of these reference points, the user can click a button on the mobile device 108. Motion signals are then provided by the mobile device 108 to the controller 106. Motion signals can be obtained each time the user points to a reference point and clicks a button on the mobile device 108. While use of button has been disclosed, any suitable method for activating data transmission between the mobile device 108 and the controller 106 can be used such as pressing a button on a graphical user interface (GUI), tapping a screen of the mobile device 108 or other similar action. Using the motion signals obtained at each reference point interaction, the controller 106 can determine a frame of reference 132. In this example, the frame of reference 132 defines an outer peripheral geometry of the first display 102. The Cartesian X and Y coordinates noted above are determined relative to the frame of reference 132. In general, a position of each two or three-dimensional representation provided on the first display 102 can be determined relative to the frame of reference 132. The frame of reference 132 is also used to determine what the laser beam 120 is being directed towards in subsequent pointing operations.

Generally, the controller 106 can obtain motion signals from the mobile device 108 and determine any the location, direction, or orientation of the mobile device 108, which are indicative of the location, direction, or orientation of the ray of the laser beam 120. In sum, processes used to define the frame of reference 132 are referred to generally as initialization or calibration, whereas processes used to define what the laser beam 120 is being pointed at within the frame of reference 132 is referred to generally as localization. Stated otherwise, object (either two and/or three-dimensional representation) selection occurs through the use of motion signals generated by the mobile device 108. The controller 106 can use these data to identify the location, direction, and/or orientation of the mobile device 108 relative to the frame of reference 132 by determining an intersection of the ray of the laser beam 120 with an object (using its digital model), such as the model of the three-dimensional representation 112. The ray of the laser beam 120 intersects the rectangular prism defined by the model of the three-dimensional representation 112.

Figure 4:
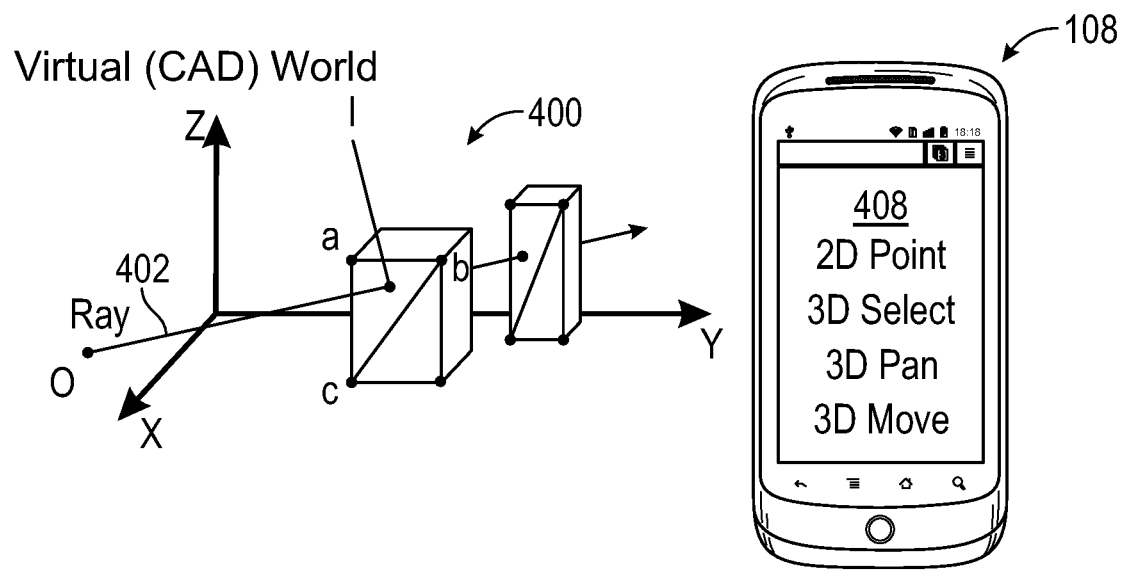
FIG. 4 illustrates an example process for determining the intersection of a ray with a three-dimensional representation.

FIG. 4 illustrates an example three-dimensional model 400 and an intersection of a ray 402 of a laser beam with the three-dimensional model 400. As noted above, an initial point O correlates to a location of the mobile device with laser pointing apparatus. Ray-object intersections can be determined by the controller 106 (see FIG. 1) by combining a mathematical equation for the ray 402 into an equation for the three-dimensional model 400. The controller 106 then determines if there is a real solution. If there is a real solution then there is an intersection of the ray 402 with the three-dimensional model 400. The controller can then use a distance between the point O and the intersection point I to determine which object has been selected.

Generally, a ray 402 begins at point O and extends in one direction. The ray 402 can be defined as all points p, such that p=O+td, ∀t≥0. A triangle can be defined by the controller 106 using the three vertices a, b and c as p=αa+βb+γc; where 1=α+β+γ and 0≤α≤1, 0≤β≤1, 0≤γ≤1. To find the intersection point I, the controller 106 solves the following equation: o+td=a+β(b−a)+γ(c−a) or β(a−b)+γ(a−c).+td=a−o. Since the variables are in three dimensions, the equation can be rewritten as:

$$\begin{pmatrix} ax-bx & ax-cx & dx \\ ay-by & ay-cy & dy \\ az-bz & az-cz & dz \end{pmatrix} \begin{pmatrix} \beta \\ \gamma \\ \tau \end{pmatrix} = \begin{pmatrix} ax-oz \\ ay-oy \\ az-oz \end{pmatrix}$$

According to some embodiments, the mobile device 108 can be configured to provide the user with a plurality of selections related functional modes for interacting with the first display 102. The following example use cases describe functional modes. Example functional modes are illustrated as a GUI 408 on the mobile device 108.

Figure 5:
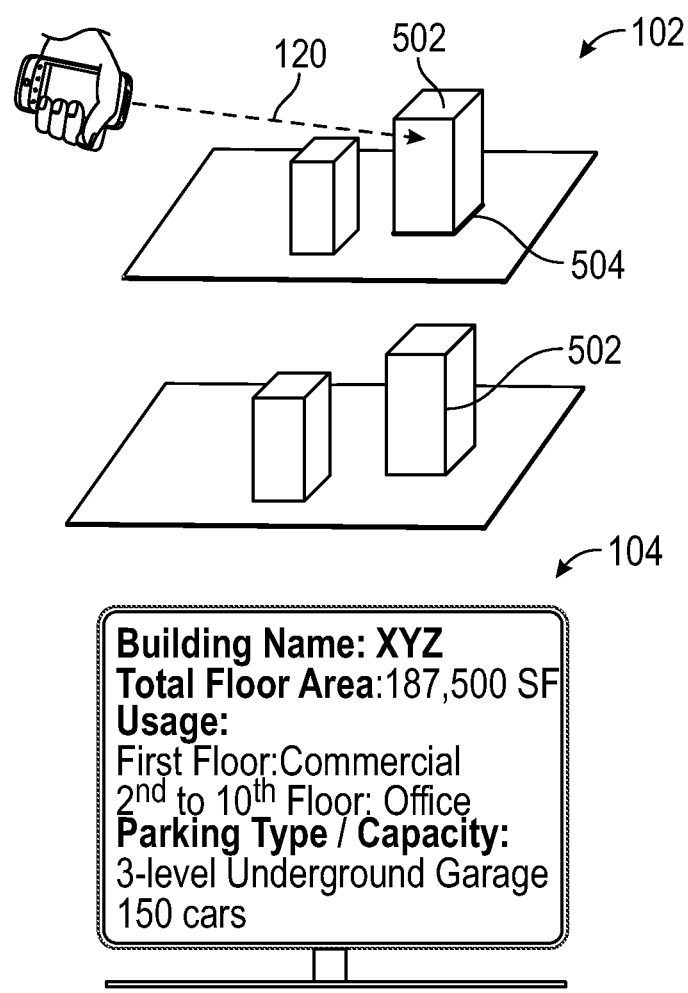
FIG. 5 illustrates an example functional mode for selecting, highlighting, and displaying data associated with a three-dimensional representation.

FIG. 5 illustrates an example use case of the present disclosure related to a point and display functional mode for three-dimensional objects. A user can select a three-dimensional point and display functional mode from a menu (e.g., GUI provided on the mobile device as in FIG. 4). The user then directs a laser beam 120 of the mobile device at an object of interest 502 on the first display 102. A calibration and determination process can be performed to determine the object of interest 502 that intersects with the laser beam 120. A mapping of the object of interest 502 to a corresponding polygon 504 on the first display 102. This can result in a highlighting of the polygon 504 and corresponding illumination of the object of interest 502 occurs, which in this example includes a translucent physical representation of a building. The user can confirm the selection of the highlighted polygon 504 using any suitable input means. As noted above, this could include actuating a button or even using voice input. Once selected, specific information for the object of interest 502 can be displayed on the second display 104. To be sure, after confirmation, different modes of user input can be utilized such as voice input in order to perform various system commands. For example, a voice command could be used to deselect the object of interest 502.

Figure 6:
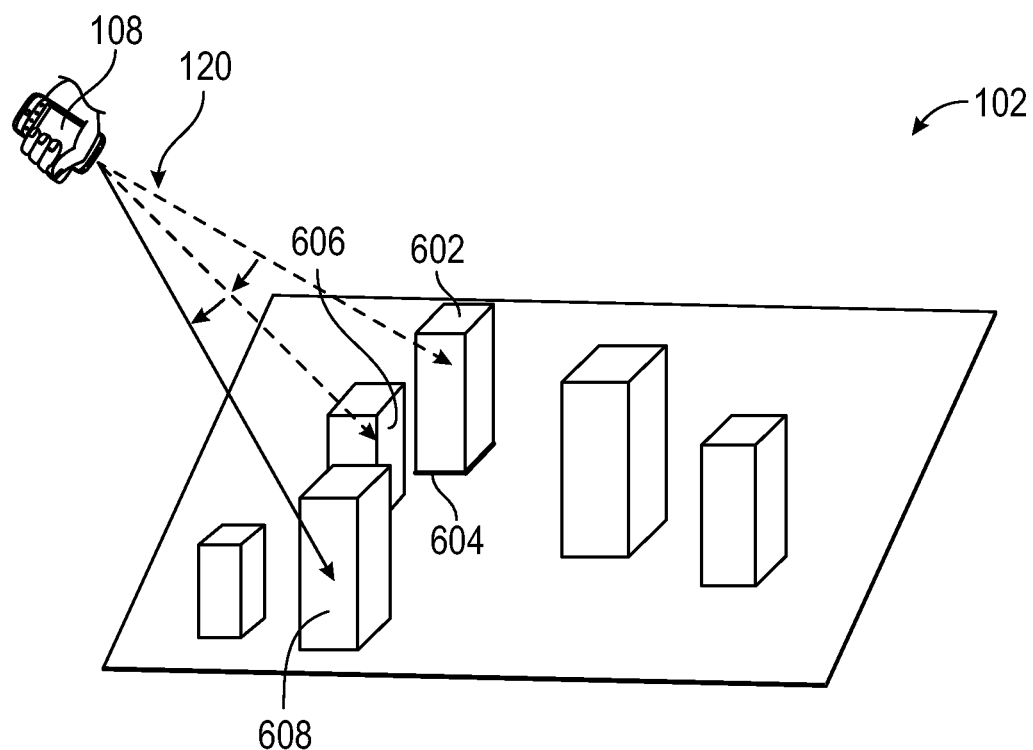
FIG. 6 illustrates an example functional mode for selecting and panning across a plurality three-dimensional representations.

FIG. 6 illustrates another example use case of the present disclosure related to panning of three-dimensional objects, which is another example functional mode. In some embodiments, the user selects a panning functional mode from a menu (e.g., GUI provided on the mobile device). The user points the laser beam 120 of the mobile device 108 at an object of interest 602 on the first display 102. A calibration and determination can be made that the object of interest 602 is associated with a particular three-dimensional model associated with a two-dimensional polygon provided on the first display 102. A mapping of the three-dimensional model with the two-dimensional polygon 604 is performed. The user then pans the laser beam 120 to each of two or more objects of interest 606 and 608. The user can indicate that the panning action is complete through an input to the mobile device 108. This process allows the user attract audience attention by panning and highlighting the objects of interest.

Figure 7:
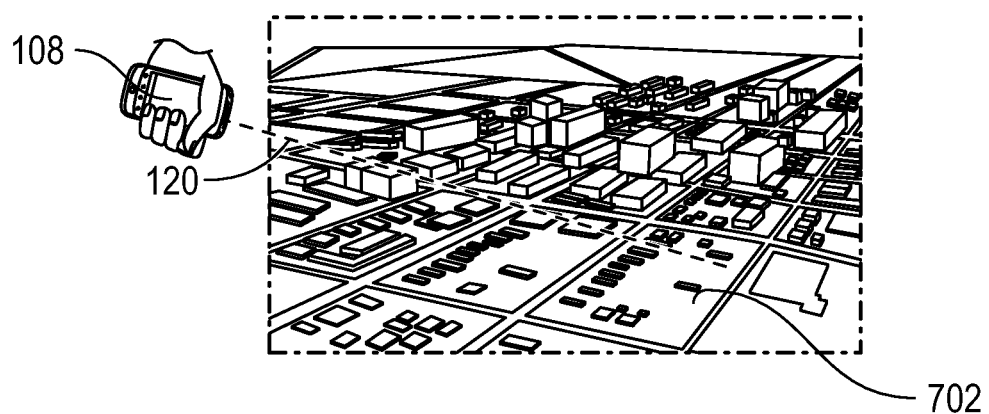
FIG. 7 illustrates an example two-dimensional functional mode for selecting, highlighting, and displaying data associated with a two-dimensional representation.

FIG. 7 illustrates another example use case of the present disclosure related to a pointer and cursor function for interacting with two-dimensional objects on a display. A user can select a two-dimensional cursor functional mode from a menu (e.g., GUI provided on the mobile device). A cursor synchronization mode is triggered based on the selection of this functional mode. The user then points the laser beam 120 of the mobile device 108 at an object of interest 702 on the first display 102, which in this instance includes a spot or location on the first display 102. For example, the user can select a street by pointing the laser beam 120 at a spot along the street. A cursor may appear at this spot (see FIG. 3). The user can perform operations such as a left click or a right click to execute various mouse related operations. In some embodiments, a left click and drag operation allows the user to draw a geo-fence around one or more objects in the first display 102. In another example, the left click and drag can be used to draw a potential location of an object, such as a transit station. The user could also point and left click to select and move another object such as a bus station. The user can also point and left click to display object specific information related to a parcel of land, such as zoning type.

It will be understood that while some embodiments herein contemplate the use of a single mobile device, other embodiments may allow for the use of two or more laser-enabled mobile devices to interact with two or three-dimensional objects on a tabletop display. Thus, the systems and methods herein can be adapted to provide a collaborative environment where two or more participants are each equipped with a pointing device (e.g., mobile device with integrated laser pointing apparatus). Each participant's laser beam and point cursor on the tabletop screen could be distinguished by a different color. Discussion and brainstorming can be supported through collaborative sketching on the tabletop screen using the two or more laser-enabled mobile devices.

Figure 8:
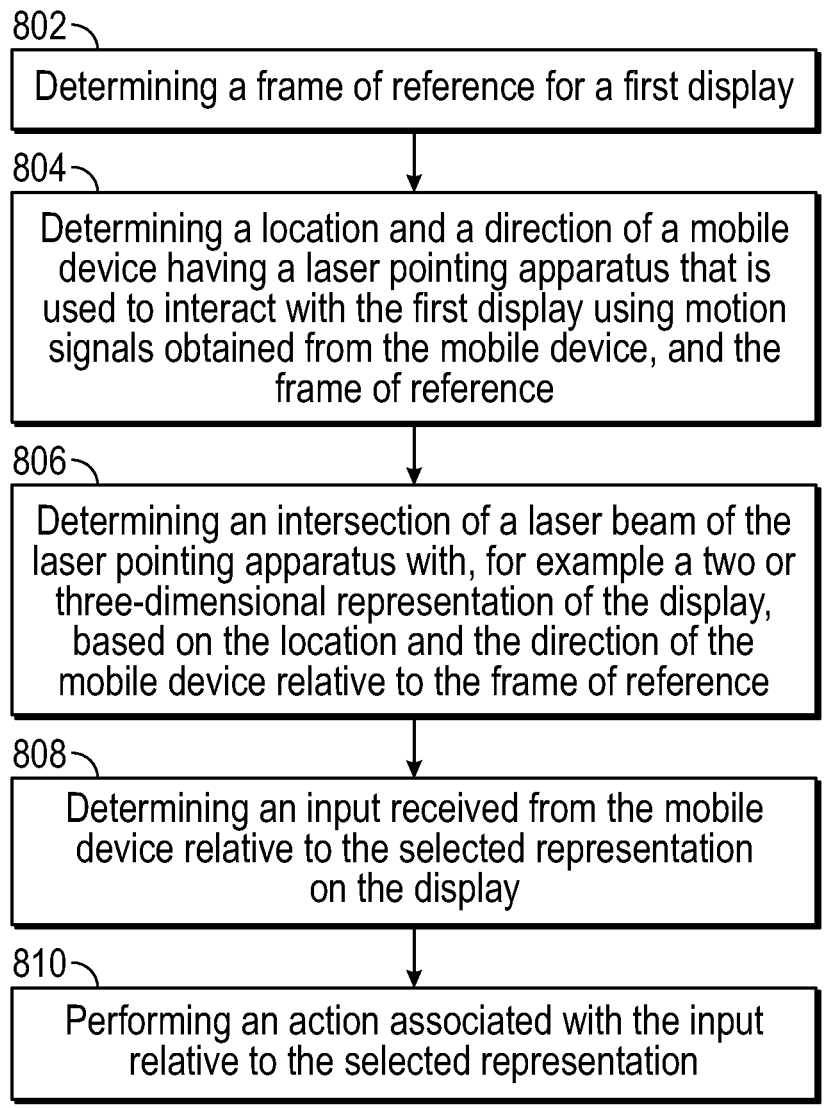
FIG. 8 is a flowchart of an example method of the present disclosure.

FIG. 8 is a flowchart of an example method of the present disclosure. The method can be performed in the context of a mobile device having a laser pointing apparatus and a display that is configured to provide a multi-dimensional display, which can include either or both two-dimensional and three-dimensional representations. In some embodiments, the methods include a step 802 of determining a frame of reference for a first display. To be sure, the first display is configured to provide a digital multi-dimensional representation. For example, the first display can provide a two-dimensional dynamic representation of data, along with physical three-dimensional representations. As noted above, the display is configured to provide the physical three-dimensional representations by placing the physical three-dimensional representations on top of the two-dimensional dynamic representation of data.

With respect to the creation of the frame of reference, this process is performed by the user pointing a laser beam of their mobile device at various reference points on the display. Motion signals are obtained during this process in order to determine the frame of reference and assess a location, position, and/or orientation of the mobile device, which is indicative of a direction of a ray of the laser beam emitted by the mobile device.

In various embodiments, the method includes a step 804 of determining a location and a direction of a mobile device having a laser pointing apparatus that is used to interact with the first display using motion signals obtained from the mobile device, and the frame of reference. That is, after the frame of reference is determined, motion signals from the mobile device are used in combination with the frame of reference. In some embodiments, the method includes a step 806 of determining an intersection of a laser beam of the laser pointing apparatus with, for example a two or three-dimensional representation of the display, based on the location and the direction of the mobile device relative to the frame of reference. To be sure the direction of the mobile device corresponds to a direction of a ray that represents the laser beam.

Once a determination has been made that the laser beam is pointing at an object, the method further includes a step 808 determining an input received from the mobile device relative to the selected representation on the display. This input could include a button click, a screen tap, voice command, or other similar input. In response to the input, the method includes a step 810 of performing an action associated with the input relative to the selected representation. In one embodiment, this could include displaying informational data related to the selected representation on a second display. To be sure, the input type and associated action(s) are based on a functional mode selected for the mobile device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   a mobile device comprising:
      a motion sensor that generates motion signals; and a laser pointing apparatus that outputs a laser beam that is defined by a ray;
a first display configured to provide a multi-dimensional representation of an object, wherein the multi-dimensional representation comprises a physical three-dimensional representation extending from the first display and a two-dimensional representation associated with the physical three-dimensional representation; and
a controller comprising a processor and memory, the processor executing instructions stored in memory to:
determine a frame of reference for the first display;
determine a location and a direction of the mobile device based on the motion signals using the frame of reference;
determine an intersection of the ray of the laser beam and the multi-dimensional representation based on the location and the direction of the mobile device relative to the frame of reference;
map a digital model of the physical three-dimensional representation to a location of a two-dimensional polygon on the first display that is within the frame of reference based on the intersection of the ray with the location of the two-dimensional polygon; and
highlight the two-dimensional polygon when the ray of the laser beam is determined to intersect the digital model.

2. The system according to claim 1, wherein the frame of reference is determined when the laser beam is directed at a plurality of reference points on the first display and the motion signals are received when the laser beam is directed at a plurality of reference points, the frame of reference being calculated from the motion signals.

3. The system according to claim 1, wherein the motion sensor includes at least one of an accelerometer, a gyroscope, or combinations thereof.

4. The system according to claim 1, wherein the controller is further configured to:
receive a signal that is indicative of an input into the mobile device when the ray and the multi-dimensional representation are determined to intersect; and
perform an action relative to the multi-dimensional representation based on the signal.

5. The system according to claim 4, further comprising a second display, wherein the action comprises the controller causing a display of content related to the multi-dimensional representation on the second display, and further wherein the first display is horizontally oriented relative to a user of the mobile device and the second display is oriented relative to the user of the mobile device.

6. The system according to claim 1, wherein the mobile device is configured to provide a graphical user interface that allows a user to select a functional mode for interacting with the first display.

7. A method, comprising:
determining a frame of reference for a first display, the first display providing a multi-dimensional representation;
determining a location and a direction of a laser beam emitted by a mobile device having a laser pointing apparatus using motion signals obtained from the mobile device, and the frame of reference, wherein the first display comprises a two-dimensional display surface and a physical three-dimensional representation placed onto the two-dimensional display surface;
determining an intersection of a laser beam of the laser pointing apparatus with either the physical three-dimensional representation or the two-dimensional display surface based on the location and the direction of the mobile device relative to the frame of reference, wherein the direction of the mobile device corresponds to a direction of a ray that represents the laser beam;
mapping a digital model of the physical three-dimensional representation to a location of a two-dimensional polygon on the first display that is within the frame of reference based on the intersection of the ray with the location of the two-dimensional polygon; and
highlighting the two-dimensional polygon when the ray of the laser beam is determined to intersect the digital model.

8. The method according to claim 7, further comprising:
determining an input received from the mobile device relative to the two-dimensional display surface or the physical three-dimensional representation; and
performing an action associated with the input relative to the two-dimensional display surface or the physical three-dimensional representation.

9. The method according to claim 8, further comprising providing a graphical user interface that allows a user to select a functional mode for interacting with the first display, the functional mode defining the input and the action.

10. The method according to claim 9, further comprising causing a display of content related to the physical three-dimensional representation on a second display, wherein the first display is horizontally oriented relative to a user of the mobile device and the second display is oriented relative to the user of the mobile device.

11. The method according to claim 7, wherein determining the frame of reference further comprises receiving the motion signals from the mobile device when the laser beam is pointed at each of a plurality of reference points on the first display; and wherein the frame of reference is determined from the motion signals.

12. A device, comprising:
a processor; and
a memory for storing executable instructions, the processor executing the instructions to:
determine a frame of reference for a first display, the first display providing a multi-dimensional representation;
determine a location and a direction of a mobile device having a laser pointing apparatus that is used to interact with the first display using motion signals obtained from the mobile device, and the frame of reference, wherein the first display comprises a physical three-dimensional representation and a two-dimensional display surface;
determine an intersection of a laser beam of the laser pointing apparatus with either a digital model of a physical three-dimensional representation or the two-dimensional display surface based on the location and the direction of the mobile device relative to the frame of reference, wherein the direction of the mobile device corresponds to a direction of a ray that represents the laser beam;
map a digital model of the physical three-dimensional representation to a location of a two-dimensional polygon on the first display that is within the frame of reference based on the intersection of the ray with the location of the two-dimensional polygon; and
highlight the two-dimensional polygon when the ray of the laser beam is determined to intersect the digital model.

13. The device according to claim 12, wherein the processor is further configured to:

determine an input received from the mobile device relative to the physical three-dimensional representation or the two-dimensional display surface; and perform an action associated with the input relative to the physical three-dimensional representation or the two-dimensional display surface.

14. The device according to claim 12, wherein highlighting the two-dimensional polygon causes highlighting of the physical three-dimensional representation.

15. The device according to claim 12, wherein the motion signals are generated by a motion sensor comprising at least one of an accelerometer, a gyroscope, or combinations thereof.

16. The device according to claim 12, wherein the mobile device is configured to provide a graphical user interface that allows a user to select a functional mode for interacting with the first display.

* * * * *